United States Patent
Huang et al.

(10) Patent No.: US 9,298,337 B2
(45) Date of Patent: Mar. 29, 2016

(54) MECHANISM TO REDUCE ACCIDENTAL CLICKS ON ONLINE CONTENT

(71) Applicant: Google Inc., Mountain View, CA (US)

(72) Inventors: Allen Huang, Mountain View, CA (US); Akiva Bamberger, Mountain View, CA (US); David Lewis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 262 days.

(21) Appl. No.: 13/761,691

(22) Filed: Feb. 7, 2013

(65) Prior Publication Data

US 2014/0223361 A1 Aug. 7, 2014

(51) Int. Cl.
*G06F 3/0481* (2013.01)
*G06F 3/0484* (2013.01)

(52) U.S. Cl.
CPC .......... *G06F 3/0481* (2013.01); *G06F 3/04842* (2013.01)

(58) Field of Classification Search
USPC ........................................................ 715/808
See application file for complete search history.

(56) References Cited

U.S. PATENT DOCUMENTS

| | | | |
|---|---|---|---|
| 5,307,457 A | 4/1994 | Beitel et al. | |
| 5,805,165 A | 9/1998 | Thorne, III et al. | |
| 6,874,126 B1 | 3/2005 | Lapidous | |
| 7,484,184 B2 | 1/2009 | Wroblewski | |
| 7,640,503 B1* | 12/2009 | Jacquot et al. | 715/735 |
| 2002/0042750 A1 | 4/2002 | Morrison | |
| 2006/0253425 A1 | 11/2006 | Borgs et al. | |
| 2008/0319827 A1 | 12/2008 | Yee et al. | |
| 2009/0144133 A1 | 6/2009 | Cha et al. | |
| 2009/0248524 A1 | 10/2009 | Defoy et al. | |
| 2010/0145796 A1 | 6/2010 | Berry et al. | |
| 2011/0208575 A1* | 8/2011 | Bansal et al. | 705/14.25 |
| 2011/0288913 A1 | 11/2011 | Waylonis et al. | |
| 2013/0013990 A1 | 1/2013 | Green et al. | |
| 2013/0036377 A1* | 2/2013 | Colley | 715/764 |
| 2014/0223381 A1* | 8/2014 | Huang et al. | 715/863 |

OTHER PUBLICATIONS

PCT/US2014/015151 Search Report and Written Opinion dated May 16, 2014 (10 pages).

* cited by examiner

*Primary Examiner* — Peiyong Weng
(74) *Attorney, Agent, or Firm* — Foley & Lardner LLP; John D. Lanza (57) ABSTRACT

Display data is transmitted to a user interface. The display data includes an offer component for providing additional online content. The offer component includes a first region and a second region. A first user interaction is received from the user interface. It is determined whether the first user interaction occurred within one of the first region and the second region. When the first user interaction is determined to have occurred within the first region, the first user interaction is processed as a request for the additional online content associated with the offer component. When the first user interaction is determined to have occurred within the second region, a user prompt is presented for a confirmation of the request for the additional online content associated with the offer component.

15 Claims, 6 Drawing Sheets

FIG. 6

MECHANISM TO REDUCE ACCIDENTAL CLICKS ON ONLINE CONTENT

BACKGROUND

This description relates to online content displayed on a user interface and, more particularly, to a system and method for reducing accidental clicks on online content displayed on a user interface.

User devices, such as computing devices, smartphones, and computer tablets, are used for displaying online content. At least some users interact with such online content (e.g., "click" on the content) to request additional information, which is then displayed on the user device. To increase an effectiveness of the online content, organizations and businesses invest a lot of time and money each year on determining what online content should be served to certain users. For example, at least some organizations and/or businesses determine how much to spend on the online content based, at least partially, on objective metrics, such as click-through rates and conversion rates.

At least some clicks, however, are accidental. In at least some of these accidental click cases, the user has little or no intention of consuming the additional information presented as a result of the click. As such, accidental clicks may lead to a negative online experience for the user. Accidental clicks may also yield unreliable objective metrics. For example, while accidental clicks may increase a click-through rate associated with the online content, they may also decrease a conversion rate associated with the online content.

To facilitate increasing a reliability of the objective metrics, accidental clicks may be discounted and/or removed when calculating the objective metrics. Determining whether a click was accidental or intentional after the click has been processed, however, may be tedious and/or time-consuming and does not directly promote a positive online experience for the user.

BRIEF DESCRIPTION OF THE DISCLOSURE

In one aspect, a method is provided for processing a click at a user interface. The method includes transmitting display data to the user interface, wherein the display data includes an offer component for providing additional online content, and the offer component includes a first region and a second region, receiving a first user interaction from the user interface, and determining whether the first user interaction occurred within one of the first region and the second region. When the first user interaction is determined to have occurred within the first region, the first user interaction is processed as a request for the additional online content associated with the offer component. When the first user interaction is determined to have occurred within the second region, a user prompt is presented for a confirmation of the request for the additional online content associated with the offer component.

In yet another aspect, one or more computer-readable storage media having computer-executable instructions embodied thereon are provided. When executed by at least one processor, the computer-executable instructions cause the processor to transmit display data to a user interface, wherein the display data includes an offer component for providing additional online content, and the offer component includes a first region and a second region, determine whether a first user interaction received from the user interface occurred within one of the first region and the second region, process the first user interaction as a request for the additional online content associated with the offer component when the first user interaction is determined to have occurred within the first region, and present a user prompt for a confirmation of the request for the additional online content associated with the offer component when the first user interaction is determined to have occurred within the second region.

In yet another aspect, a computer system is provided. The computer system includes a processor and a computer-readable storage device having encoded thereon computer-readable instructions that are executable by the processor to perform functions including transmitting display data to a user interface, wherein the display data includes an offer component for providing additional online content, and the offer component includes a first region and a second region, determining whether a first user interaction received from the user interface occurred within one of the first region and the second region, processing the first user interaction as a request for the additional online content associated with the offer component when the first user interaction is determined to have occurred within the first region, and presenting a user prompt for a confirmation of the request for the additional online content associated with the offer component when the first user interaction is determined to have occurred within the second region.

The features, functions, and advantages described herein may be achieved independently in various implementations of the present disclosure or may be combined in yet other implementations, further details of which may be seen with reference to the following description and drawings.

BRIEF DESCRIPTION OF THE DRAWINGS

FIGS. 1-6 show example implementations of subject matter described herein.

Although specific features of various implementations may be shown in some drawings and not in others, this is for convenience only. Any feature of any drawing may be referenced and/or claimed in combination with any feature of any other drawing.

DETAILED DESCRIPTION OF THE DISCLOSURE

The subject matter described herein relates generally to online content. Specifically, the methods and systems described herein enable a click associated with online content to be confirmed as an intentional click to facilitate reducing accidental clicks on online content.

Implementations described herein enable a computer system to (i) transmit display data to a user interface, wherein the display data includes an offer component for providing additional online content, and the offer component includes a first region and a second region; (ii) receive a first user interaction from the user interface; (iii) determine whether the first user interaction occurred within the first region or the second region; (iv) process the first user interaction as a request for the additional online content associated with the offer component when the first user interaction is determined to have occurred within the first region; and (v) present a user prompt for a confirmation of the request for the additional online content associated with the offer component when the first user interaction is determined to have occurred within the second region.

The following detailed description illustrates implementations of the subject matter described in this application by way of example and not by way of limitation. It is contemplated that the subject matter described herein has general application to reduce accidental clicks in any environment designed to be executed by or on a computer including, without limitation, mobile phones, smart phones, tablets, personal digital assistants, laptops, desktops, and other appropriate computers in online and offline applications.

The methods and systems described herein may be implemented using computer programming or engineering techniques including computer software, firmware, hardware or any combination or subset thereof, wherein the technical effects may be achieved by performing at least one of the following steps: a) partitioning an offer component for providing additional online content to include a first region and a second region based, at least partially, on at least one of display data and historical data; b) transmitting the display data to a user computing device for displaying on a user interface, wherein the display data includes the offer component; c) receiving a first user interaction through the user interface, wherein the user interface is configured to receive the first user interaction including, but not limited to, a mouse click or a user tap; d) determining whether the first user interaction occurred within the first region or the second region; e) processing the first user interaction as a request for the additional online content associated with the offer component when the first user interaction is determined to have occurred within the first region; f) providing access to a website and/or an application; g) presenting a user prompt for a confirmation of the request for the additional online content associated with the offer component when the first user interaction is determined to have occurred within the second region; h) displaying in the user prompt a name, a uniform resource locator, and/or a price associated with the additional online content; i) displaying the user prompt in a pop-up window or an overlay; j) dimming the first region and/or the second region; k) receiving a second user interaction; and l) determining whether the second user interaction is indicative of the confirmation of the request for the additional online content associated with the offer component.

The following detailed description of implementations consistent with the principles of the disclosure refers to the accompanying drawings. In the absence of a contrary representation, the same reference numbers in different drawings may identify the same or similar elements.

As used herein, an element or step recited in the singular and preceded with the word "a" or "an" should be understood as not excluding plural elements or steps, unless such exclusion is explicitly recited. Furthermore, references to "one implementation" of the subject matter described herein are not intended to be interpreted as excluding the existence of additional implementations that also incorporate the recited features. As used herein, the term "click" generally refers to a selection of an item. That is, a "click" is indicative of an interest in the item. In at least some implementations, a touch of an object, such as a user's finger or a stylus, on a touch screen may be perceived as a click. There are a variety of touchscreen technologies that have different methods of sensing touch. For example, in one implementation, a touch disturbs an electrostatic field and/or a surface acoustic wave on and/or adjacent a touch screen, thereby enabling a location of the touch to be determined. In another implementation, the location of the touch may be determined by detecting an object through various means including, without limitation, optical, acoustic, and/or thermal means. Historical data may be retrieved from any of a variety of sources and may include, without limitation, at least one of a web history, an email history, a search history, a transaction history, activity history, profile information, a social network, and/or any other information explicitly or implicitly obtained.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
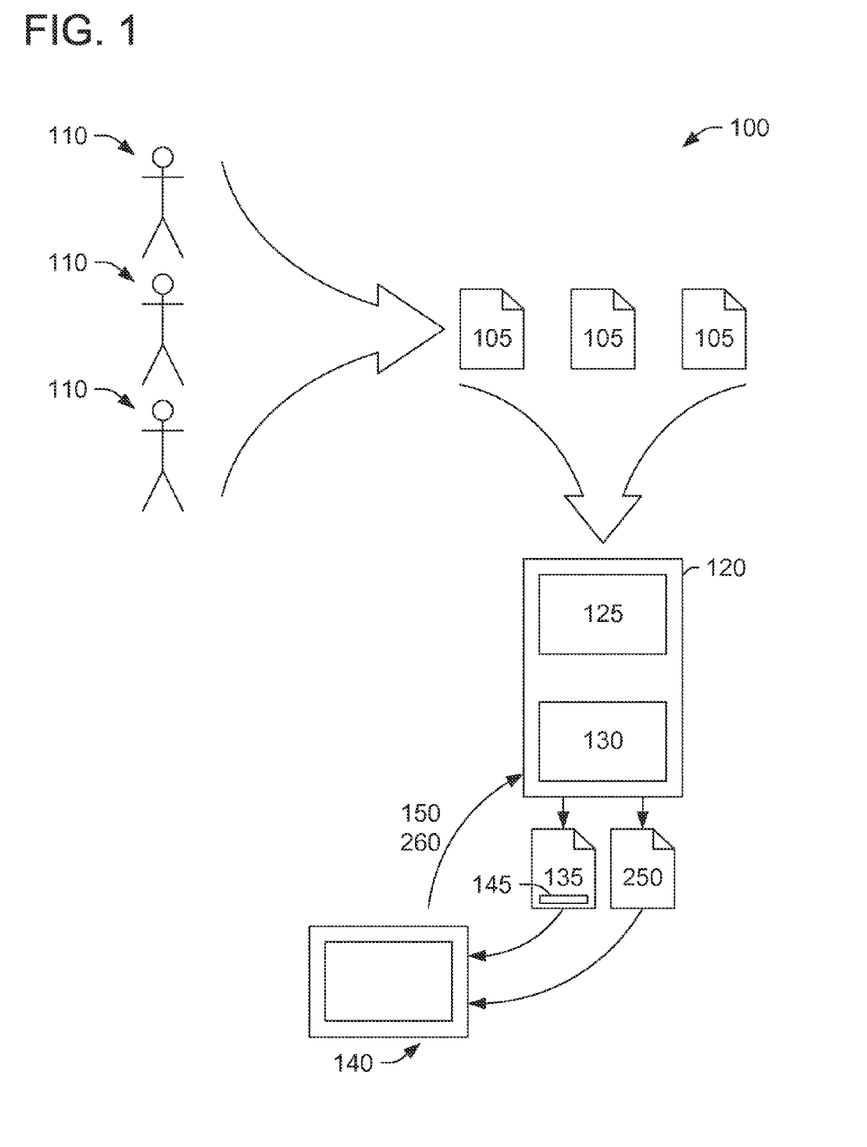
FIG. 1 is a schematic illustration of an example environment for providing online content.

FIG. 1 is a diagram of an example environment 100 for providing online content and/or a content item (e.g., an advertisement) in accordance with one implementation of the subject matter described herein. In the environment 100, a plurality of content items 105 are received from a plurality of content providers 110. Although only three content items 105 and three content providers 110 are depicted, the environment 100 may include any number of content items 105 and/or content providers 110 that enables the environment 100 to function as described herein. Even though the environment 100 relates to an Internet advertising scenario, it should be noted that the present disclosure applies to various other computing environments in which a user clicks to make a selection.

In some implementations, a server system 120 (or other computing device) includes at least a content module 125 and a confirmation module 130. In some implementations, the content module 125 is programmed to transmit display data 135 to a user interface 140 for displaying content on the user interface 140. Display data 135 may include, without limitation, content information, content format, content layout, and/or content placement. In at least some implementations, the display data 135 includes an offer component 145 (e.g., at least one of the content items 105) for providing additional online content. The additional online content may include, without limitation, a website and/or an application.

In some implementations, the content items 105 is configured and/or programmed to receive a first user interaction 150 (e.g., a click) from the user interface 140. For example, in at least one implementation, the first user interaction 150 is a request for the additional online content associated with at least one of the content items 105.

Figure 2:
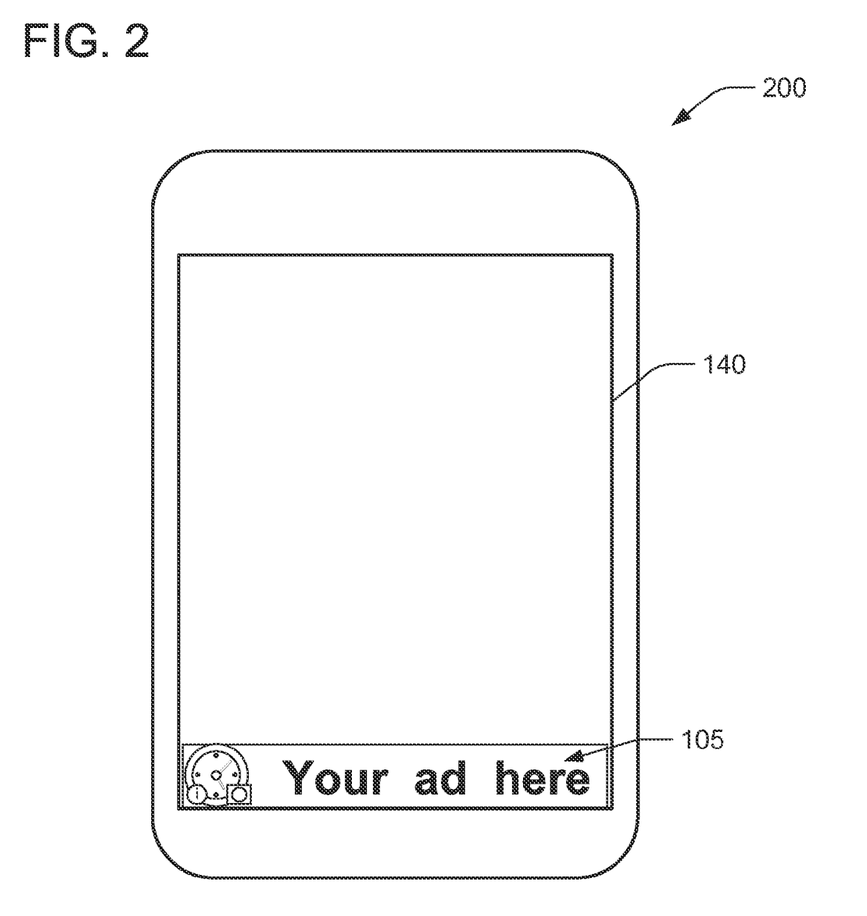
FIG. 2 is a first screenshot of an example user interface including online content.
Figure 3:
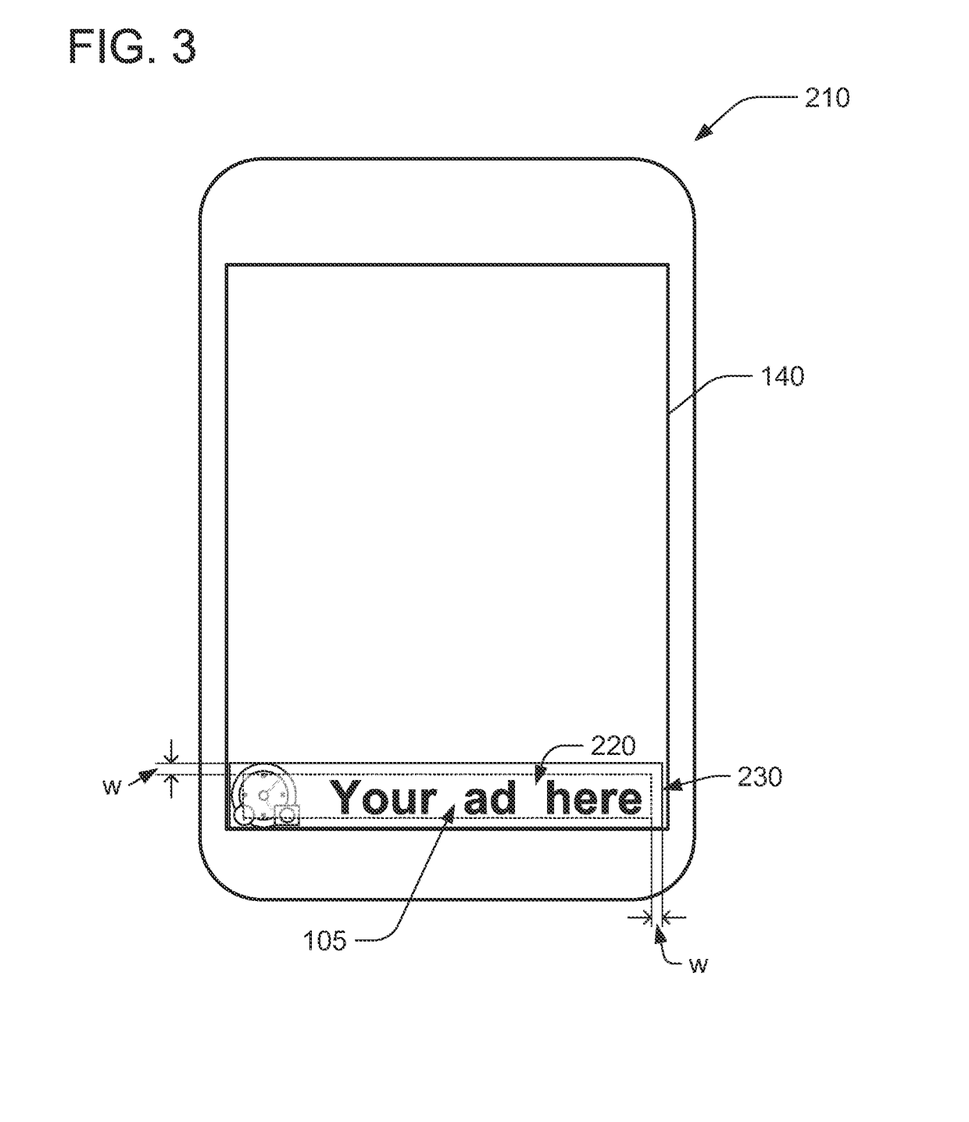
FIG. 3 is a schematic illustration of the online content shown in FIG. 2.

FIG. 2 is a first screenshot 200 of an example user interface 140 including a content item 105. FIG. 3 is a schematic illustration 210 of the content item 105. In some implementations, the content item 105 includes at least a first region 220 (inside of the dashed box shown in FIG. 3) and a second region 230 (outside of the dashed box shown in FIG. 3). For example, as shown in FIG. 3, the second region 230 circumscribes the first region 220 and extends along a perimeter of the content item 105. In at least one implementation, second region 230 has a width W of approximately 10 pixels. Alternatively, the first region 220 and/or second region 230 may have any format and/or layout that enables the content item 105 to function as described herein.

In some implementation, the content module 125 is programmed to partition the content item 105 to include at least the first region 220 and the second region 230 based, at least partially, on the display data 135 and/or historical data associated with the user interface 140 and/or a user at the user interface 140. Alternatively, in at least one implementation, the content item 105 is partitioned at the user interface 140. In such an implementation, the display data 135 transmitted to the user interface 140 includes at least one line of code programmed to facilitate partitioning, at the user device, the content item 105 via implementation of the at least one line of code at the user device. In at least some implementations, the format and/or layout of the first region 220 and/or second region 230 may be iteratively partitioned based, at least partially, on changes in the display data 135 and/or historical data. For example, if a user has a history of clicking a portion of the screen within the first region 220 and not consuming the additional online content for longer than a predetermined threshold (e.g., clicks the back button within two seconds of clicking the portion of the screen within the first region 220), the content module 125 determines that these clicks are accidental and the content item 105 will be repartitioned to include this portion of the screen within the second region 230. Similarly, any other pattern associated with accidental clicks such as, without limitation, a timing of the click, may be identified by the content module 125 to facilitate repartitioning the content item 105 based on changes in the display data 135 and/or historical data.

In some implementations, the confirmation module 130 is programmed to determine whether the first user interaction 150 occurred within the first region 220 or the second region 230. Alternatively, in at least one implementation, the content item 105 is configured and/or programmed to determine whether the first user interaction 150 occurred within the first region 220 or the second region 230 at the user interface 140 and transmit the determination to the server system 120 from the user interface 140. In such an implementation, the display data 135 transmitted to the user interface 140 includes at least one line of code programmed to facilitate determining, at the user device, whether the first user interaction 150 occurred within the first region 220 or the second region 230 via implementation of the at least one line of code at the user device. In some implementations, when the first user interaction 150 is determined to have occurred within the first region 220, the first user interaction 150 is processed as a request for additional online content associated with the content item 105.

Figure 4:
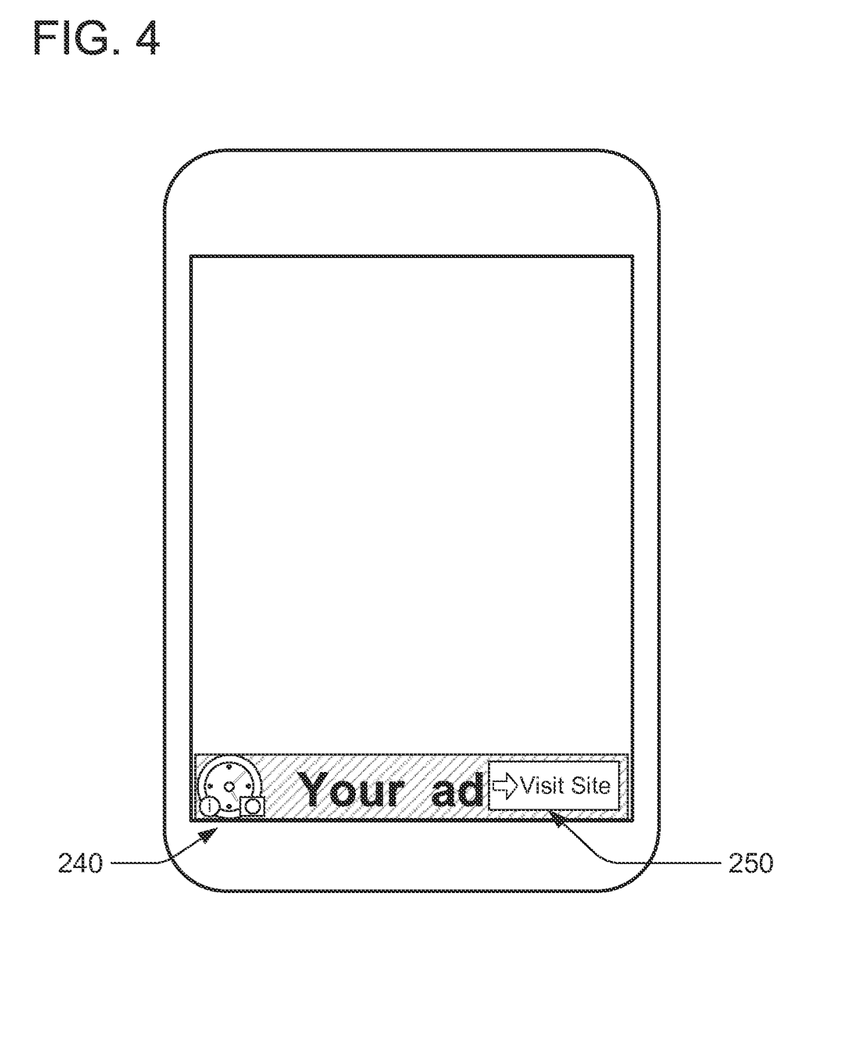
FIG. 4 is a second screenshot of the user interface shown in FIG. 2.

FIG. 4 is a second screenshot 240 including a user prompt 250 displayed on the user interface 140 when the first user interaction 150 is determined to have occurred within the second region 230. More specifically, in some implementations, the confirmation module 130 is programmed to receive the first user interaction 150 from the user interface 140 and transmit the user prompt 250 to the user interface 140 when the first user interaction 150 is determined to have occurred within the second region 230. Alternatively, in at least one implementation, the content item 105 is configured and/or programmed to display the user prompt 250 at the user interface 140 when the first user interaction 150 is determined to have occurred within the second region 230. In such an implementation, the display data 135 transmitted to the user interface 140 includes at least one line of code programmed to facilitate displaying, at the user device, the user prompt 250 via implementation of the at least one line of code at the user device.

In some implementations, the user prompt 250 is configured and/or programmed to display in a pop-up window and/or an overlay positioned over at least a portion of the content item 105. Additionally or alternatively, in at least some implementations, the first region 220 and/or the second region 230 is deemphasized and/or dimmed to facilitate emphasizing and/or highlighting the user prompt 250. The user prompt 250 may include any information and/or have any format and/or layout that enables the content item 105 to function as described herein. For example, in at least some implementations, the user prompt 250 may include at least some content associated with the content item 105 and/or the additional online content including, without limitation, a name, a uniform resource locator, and/or a price.

In some implementations, the user prompt 250 is configured and/or programmed to receive a confirmation of the request for the additional online content. More specifically, in at least some implementations, the confirmation module 130 is programmed to receive a second user interaction 260 (shown in FIG. 1) from the user interface 140 and determine whether the second user interaction 260 is indicative of a confirmation of the request for the additional online content. Alternatively, in one implementation, the user prompt 250 is configured and/or programmed to determine whether the second user interaction 260 is indicative of the confirmation at the user interface 140. In such an implementation, the display data 135 transmitted to the user interface 140 includes at least one line of code programmed to facilitate determining, at the user device, whether the second user interaction 260 is indicative of the confirmation via implementation of the at least one line of code at the user device.

In some implementations, when the second user interaction 260 is determined to be indicative of the confirmation, the second user interaction 260 is processed as a request for additional online content associated with the content item 105. In some implementations, when the second user interaction 260 is determined to be indicative of a denial of the confirmation, the user prompt 250 is removed from the display, and the user interface 140 displays the content shown in the first screenshot 200.

Figure 5:
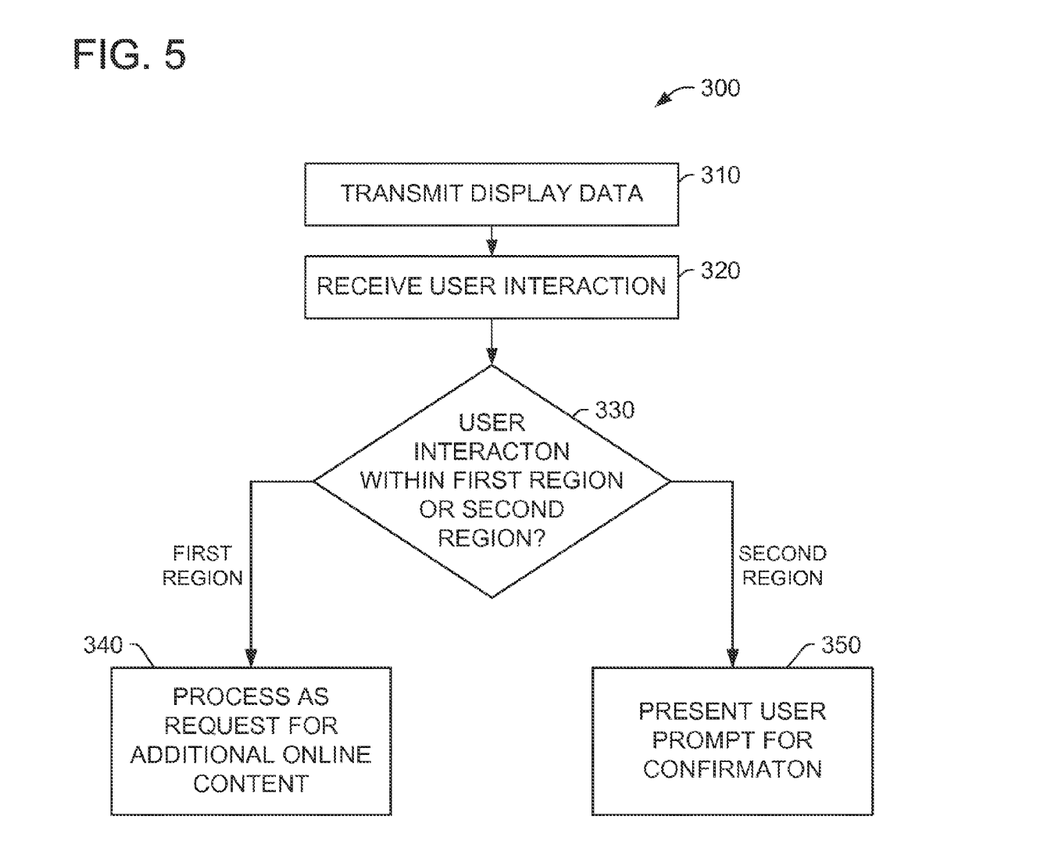
FIG. 5 is a flowchart of an example method that may be implemented in the environment shown in FIG. 1 to reduce accidental clicks on online content.

FIG. 5 is a flowchart of an example method 300 that may be implemented in the environment shown in FIG. 1 to reduce accidental clicks on online content. During operation, in some implementations, display data 135 is transmitted 310 to a user interface 140 for presenting online content to a user. In at least some implementations, the online content includes at least one content item 105. In some implementations, a first user interaction 150 is received 320 from the user at the user interface 140, and it is determined 330 whether the first user interaction 150 occurred within the first region 220 or the second region 230.

In some implementations, access to a website and/or an application is provided as a result of the first user interaction 150. For example, in at least some implementations, the first user interaction 150 is processed 340 as a request for additional online content associated with the content item 105 when the first user interaction 150 is determined to have occurred within the first region 220. When the first user interaction 150 is determined to have occurred within the second region 230, the first user interaction 150 is processed as a potential request, and a user prompt 250 is presented 350 for a confirmation of the request for the additional online content. In at least some implementations, access to the website and/or an application is provided when a second user interaction 260 confirming the first user interaction 150 is received. When the confirmation is not received and/or the second user interaction 260 is indicative of a denial of the confirmation, the user prompt 250 is no longer displayed on the user interface 140.

Figure 6:
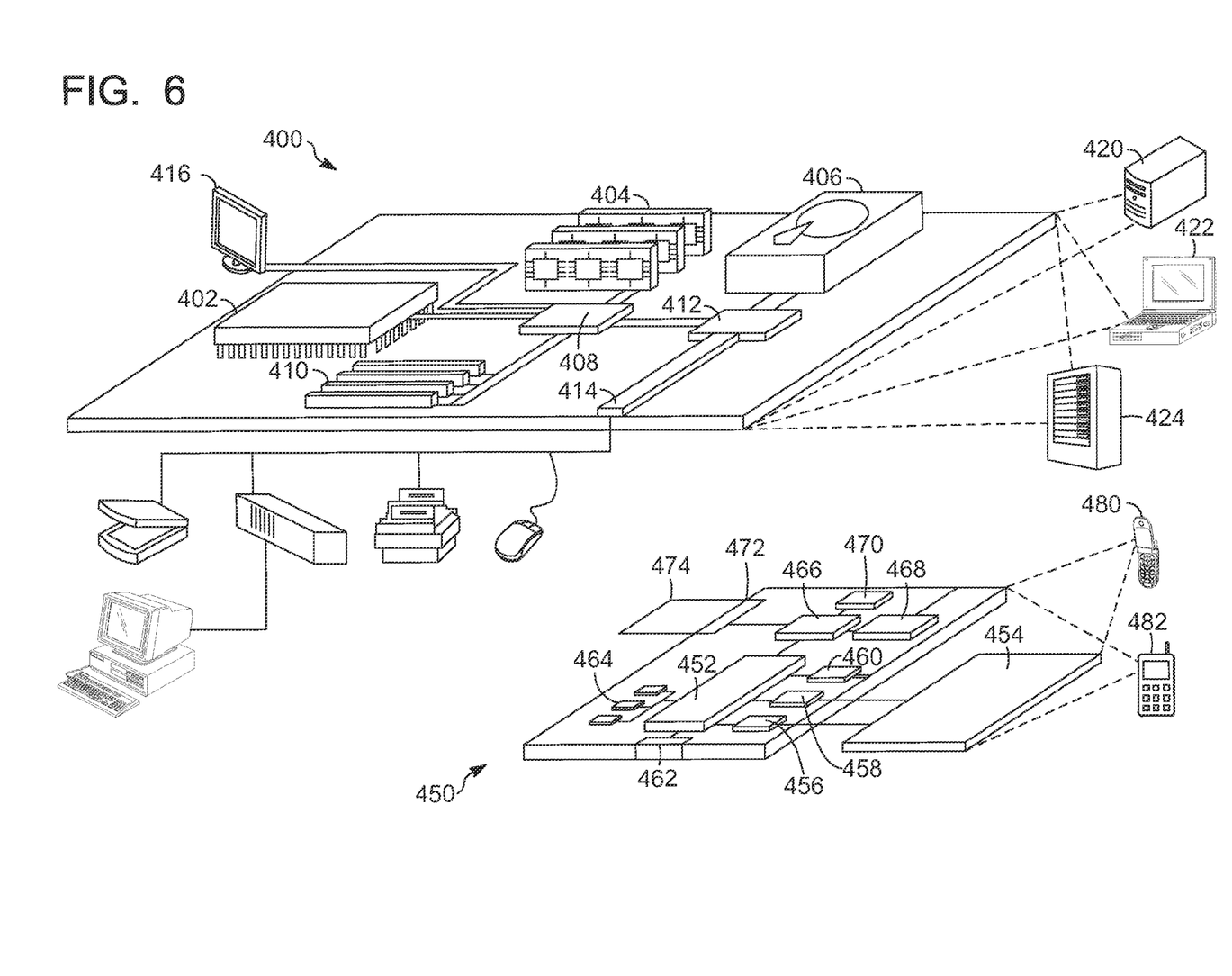
FIG. 6 is a diagram of example computing systems that may be used in the environment shown in FIG. 1 to implement the method shown in FIG. 5.

FIG. 6 is a diagram of example computing devices 400 and 450 that may be used in the environment 100. More specifically, FIG. 6 shows an example computing device 400 and an example mobile computing device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, tablets, and other similar computing devices. The components shown here, their connections and relationships, and their functions, are meant to be example only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to the user. The control interface 458 may receive commands from the user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable storage medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communications may occur, for example, through radio-frequency transceiver 468. In addition, short-range communication may occur, such as using a Bluetooth, WiFi, or other such transceiver (not shown). In addition, GPS (Global Positioning system) receiver module 470 may provide additional navigation- and location-related wireless data to device 450, which may be used as appropriate by applications running on device 450.

Device 450 may also communicate audibly using audio codec 460, which may receive spoken information from the user and convert it to usable digital information. Audio codec 460 may likewise generate audible sound for the user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable storage medium" and "computer-readable storage medium" refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term "machine-readable signal" refers to any signal used to provide machine instructions and/or data to a programmable processor. The machine-readable storage medium and computer-readable medium do not include transitory signals.

To provide for interaction with the user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with the user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which the user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

It will be appreciated that the above implementations that have been described in particular detail are merely examples or possible implementations, and that there are many other combinations, additions, or alternatives that may be included.

Also, the particular naming of the components, capitalization of terms, the attributes, data structures, or any other programming or structural aspect is not mandatory or significant, and the mechanisms that implement the features may have different names, formats, or protocols. Further, systems described herein may be implemented via a combination of hardware and software, as described, or entirely in hardware elements. Also, the particular division of functionality between the various system components described herein is merely example, and not mandatory; functions performed by a single system component may instead be performed by multiple components, and functions performed by multiple components may instead performed by a single component.

Some portions of the above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed implementations may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer-readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific implementations, it will be recognized that the disclosure can be practiced with modification within the spirit and scope of the claims.

What is claimed is:

1. A method for processing a click at a user interface, the method implemented using a computing device coupled to a memory device, the method comprising:
   partitioning an offer component to include a first region and a second region based on historical data;
   transmitting display data to the user interface, wherein the display data includes the offer component for providing additional online content, and the offer component includes the first region, the second region, and a border between the first region and the second region, wherein the border is not visible when the offer component is displayed on the user interface;
   receiving a first user interaction from the user interface within the first region;
   requesting, responsive to receiving the first user interaction, the additional online content associated with the offer component;
   receiving a second user interaction within the second region;
   presenting, responsive to receiving the second user interaction, a user prompt for a confirmation of the request for the additional online content associated with the offer component;
   receiving a third user interaction; and
   determining the third user interaction is indicative of confirmation of the request for the additional online content associated with the offer component.

2. A method in accordance with claim 1, wherein the additional online content is one of a web site and an application.

3. A method in accordance with claim 1, wherein the user prompt includes at least one of a name, a uniform resource locator, and a price associated with the additional online content.

4. A method in accordance with claim 1, wherein the user prompt is displayed in one of a pop-up window and an overlay.

5. A method in accordance with claim 1 further comprising dimming at least one of the first region and the second region in comparison to the user prompt when the user prompt is displayed.

6. One or more non-transitory computer-readable storage media having computer-executable instructions embodied thereon, wherein, when executed by at least one processor, the computer-executable instructions cause the processor to:
   partition an offer component to include a first region and a second region based on historical data;
   transmit display data to a user interface, wherein the display data includes the offer component for providing additional online content, and the offer component includes the first region, the second region, and a border between the first region and the second region, wherein the border is not visible when the offer component is displayed on the user interface;
   receive a first user interaction within the first region;
   request, responsive to receiving the first user interaction, the additional online content associated with the offer component;
   receive a second user interaction within the second region;
   present, responsive to receiving the second user interaction, a user prompt for a confirmation of the request for the additional online content associated with the offer component;
   receive a third user interaction; and
   determine the third user interaction is indicative of the confirmation of the request for the additional online content associated with the offer component.

7. The non-transitory computer-readable storage media in accordance with claim 6, wherein the computer-executable instructions further cause the processor to provide access to at least one of a website and an application.

8. The non-transitory computer-readable storage media in accordance with claim 6, wherein the computer-executable instructions further cause the processor to display in the user prompt at least one of a name, a uniform resource locator, and a price associated with the additional online content.

9. The non-transitory or computer-readable storage media in accordance with claim 6, wherein the computer-executable instructions further cause the processor to display the user prompt in one of a pop-up window and an overlay.

10. The non-transitory computer-readable storage media in accordance with claim 6, wherein the computer-executable instructions further cause the processor to dim at least one of the first region and the second in comparison to the user prompt when the user prompt is displayed.

11. A computer system comprising:
   a processor; and
   a computer-readable storage device having encoded thereon computer-readable instructions that are executable by the processor to perform functions comprising:
      partitioning an offer component to include a first region and a second region based on historical data;

transmitting display data to a user interface, wherein the display data includes the offer component for providing additional online content, and the offer component includes the first region, the second region, and a border between the first region and the second region, wherein the border is not visible when the offer component is displayed on the user interface;

receiving a first user interaction within the first region;

requesting, responsive to receiving the first user interaction, the additional online content associated with the offer component; and receiving a second user interaction within the second region;

presenting, responsive to receiving the second user interaction, a user prompt for a confirmation of the request for the additional online content associated with the offer component;

receiving a third user interaction; and determining the third user interaction is indicative of the confirmation of the request for the additional online content associated with the offer component.

12. A computer system in accordance with claim 11, wherein the functions performed by the processor further comprise providing access to at least one of a website and an application.

13. A computer system in accordance with claim 11, wherein the functions performed by the processor further comprise displaying in the user prompt at least one of a name, a uniform resource locator, and a price associated with the additional online content.

14. A computer system in accordance with claim 11, wherein the functions performed by the processor further comprise displaying the user prompt in one of a pop-up window and an overlay.

15. A computer system in accordance with claim 11, wherein the functions performed by the processor further comprise dimming at least one of the first region and the second region in comparison to the user prompt when the user prompt is displayed.

* * * * *